United States Patent [19]

Remillard

[11] Patent Number: 5,396,546
[45] Date of Patent: *Mar. 7, 1995

[54] APPARATUS AND METHOD FOR AUTOMATIC AND USER CONFIGURABLE INFORMATION APPLIANCE

[75] Inventor: Roger Remillard, Skokie, Ill.

[73] Assignee: Viscorp, Chicago, Ill.

[*] Notice: The portion of the term of this patent subsequent to Jan. 11, 2011 has been disclaimed.

[21] Appl. No.: 770,520

[22] Filed: Oct. 3, 1991

[51] Int. Cl.6 .......................................... H04M 11/00
[52] U.S. Cl. ..................................... 379/96; 379/105; 348/6; 348/13; 348/468; 348/552
[58] Field of Search ........................... 379/105, 96–98, 379/93, 90, 110, 53, 54; 358/84–86; 178/18, 19; 340/707, 712; 348/2, 3, 6–8, 10–18, 468, 461, 569, 552, 553, 734

[56] References Cited

U.S. PATENT DOCUMENTS

| | | |
|---|---|---|
| 3,822,363 | 7/1974 | Mayer et al. |
| 4,161,728 | 7/1979 | Insam . |
| 4,203,130 | 5/1980 | Doumit et al. |
| 4,329,684 | 5/1982 | Monteath et al. ............ 340/712 |
| 4,361,725 | 11/1982 | Dagnelie et al. ............. 340/712 |
| 4,451,701 | 5/1984 | Bendig et al. ................. 358/85 |
| 4,455,570 | 6/1984 | Saeki et al. ................... 358/86 |
| 4,456,925 | 6/1984 | Skerlos et al. ................ 358/85 |
| 4,611,227 | 9/1986 | Brockhurst et al. .......... 358/147 |
| 4,688,170 | 8/1987 | Waite et al. |
| 4,695,880 | 9/1987 | Johnson et al. ............... 358/86 |
| 4,712,191 | 12/1987 | Penna ............................ 340/712 |
| 4,712,238 | 12/1987 | Gilhousen et al. ............ 358/84 |

(List continued on next page.)

OTHER PUBLICATIONS

Gateway 2000: A Report of the Videotex Industry Association Study on North American Gateway, Oct. 1988.

(List continued on next page.)

Primary Examiner—Wing F. Chan
Attorney, Agent, or Firm—Townsend and Townsend Khourie and Crew

[57] ABSTRACT

An electronic device and method for accessing remote electronic facilities and displaying associated information on a conventional television set. The electronic device self-configures itself upon power-up or reset by initiating a data call to a configuring facility. Information related to available facilities and programming, autonomous mail checking is downloaded to the electronic device. The electronic device displays a menu including several user selectable facilities on the display for a user. The user chooses one of the options from the menu by use of a remote keypad control, similar to a conventional television remote control. The options available include printing, electronic mail and other news and information services. Interfacing the electronic device with a stylus-type pointing device permits sketching and drawing on the television, including superperposition of images on captured television images. Captured images of graphics or text are optionally stored or forwarded to a user through a mail facility accessed through operation of the system. The captured images may subsequently be sent via facsimile transmission to other facsimile machines or receivers. The electronic device includes a speaker phone capability for providing audio information received over telephones to the television speaker. A microphone on the electronic device permits two-way communication. A menu item, selectable by the remote keypad, activates this option. The television speaker use permits access to audiotext and voice mail as well.

22 Claims, 7 Drawing Sheets

Microfiche Appendix Included
(2 Microfiche, 114 Pages)

U.S. PATENT DOCUMENTS

| | | |
|---|---|---|
| 4,751,578 | 6/1988 | Reiter et al. . |
| 4,751,578 | 6/1988 | Reiter et al. . |
| 4,873,584 | 10/1989 | Hashimoto . |
| 4,893,248 | 1/1990 | Pitts et al. ............................. 358/84 |
| 4,916,737 | 4/1990 | Chomet et al. ...................... 358/84 |
| 4,972,183 | 11/1990 | Kuhlmann et al. . |
| 4,982,430 | 1/1991 | Frezza et al. ........................ 455/5.1 |
| 4,987,486 | 1/1991 | Johnson et al. ...................... 358/86 |
| 5,038,211 | 8/1991 | Hallenbeck .......................... 358/42 |
| 5,093,718 | 3/1992 | Hoarty et al. ......................... 358/86 |
| 5,119,075 | 6/1992 | Smith . |

OTHER PUBLICATIONS

Hanson, G., "Viewers Get a Piece of the Action," *Insight*, Dec. 24, 1990–Jan. 7, 1991.

Van, J., "Computer Revolution of the 90's May Hit Home Over Phone Lines," *Chicago Tribune*, Mar. 17, 1991.

Update: A Newsletter for Members of the Videotex Industry Association, vol. 9, No. 4, Apr./May 1991.

Update: A Newsletter for Members of the Videotex Industry Association, vol. 9, No. 8, Sep. 1990.

"Home Information Appliance Strategies Plotted," *Consumer Information Appliance* 1990, pp. 2, 5, 9.

Fahri, P., "Interactive Television Gets a Boost," *Washington Post*, (not dated, but prior to Oct. 3, 1991).

Levin, S. L., "Companies Provide Information Services," *Chicago Tribune*, Section 1:11 (Jun. 25, 1990).

Van, J., "International Affairs Library Is," *Chicago Tribune*, Section 7:8 (Mar. 17, 1991).

APPARATUS AND METHOD FOR AUTOMATIC AND USER CONFIGURABLE INFORMATION APPLIANCE

BACKGROUND OF THE INVENTION

The present invention relates generally to devices for accessing videotext. More specifically, the present invention relates to an electronic device for interfacing to independent computer systems through existing telephone systems (twisted pair or cellular) by use of remotely selected menu items displayed on conventional television sets.

Many commercial and public information and service sources are available in electronic form (electronic facilities). Electronic facilities includes databases storing latest news, weather, financial and recreational information, for example. Additionally, services such as consumer services, audiotext, electronic mail, and facsimile or telex transmission are available through some of the facilities. Telephone switching systems are included in the term facility.

Conventional equipment for accessing these facilities includes specially programmable personal computers having specialized communication software and hardware. To access the facilities, a user acquires the necessary computer components and configures them to permit access to selected facilities. Many users forego access to desired facilities because of the complexity and time required in acquiring and configuring the computer components. Databases vary as to requirements for their various components and configuration as well as protocol used for access, further increasing the complexity and time to access desired information or services. Due to a large number of different providers of the information and services, it is sometimes difficult to ferret out particular access information for desired facilities.

The complexity of the acquisition and configuration of the necessary computer components does more than deter potential users of the facilities. Reluctance and caution on the part of the users, as well as customer premises equipment cost, also deters and impedes development of the facilities for access by others.

SUMMARY OF THE INVENTION

The present invention provides apparatus and method for simply, efficiently and economically providing facility access to any user. The invention permits access to and use of the tremendous information and services available in electronic form without knowledge of computer components or configuration requirements. Access to information and use of the various electronic services is possible by use of a conventional numeric remote keypad for selecting particular menu items from menus displayed on conventional television sets.

According to one aspect of the present invention, it includes a television set, a communications device connected to a telephone network, a remote keypad and a controller. The controller displays menu items on the television screen and controls operation of the communications device. The menu items correspond to various services available to a user. Numbers, typically 0-9, identify the individual menu items.

In operation, the controller preferably initiates an automated configuration mode upon initial power-up. The automated configuration includes initiation of a data call to a predetermined independent computer system to acquire configuration information and operating instructions. The configuration information includes data identifying particular services desired by the individual identified user. The configuration information controls which menu choices the user may select.

The preferred embodiment of the present invention includes a built-in messaging system for the user. The system permits exchange of messages to and from other electronic device users, computer users or various facilities. In this embodiment, the operating instructions of each electronic device directs the device to autonomously initiate a messaging call to a messaging facility at predetermined times when the user is not using the telephone line. The system waits and calls later if the telephone line is in use. The controller posts any untransmitted messages at this time, and receives messages and any new configuration or operating instructions. If the controller receives new messages for the user, it lights a message indicator. This tells the user new messages are waiting, prompting the user to access them.

When the user activates the electronic device, the controller displays the selection menu which includes those options available to the user. One available menu item permits the user to read the messages. The remote keypad controls the operation of the various features of the electronic device, such as message scrolling, rereading, saving or deleting particular messages, for example.

When the user desires to access the information and services, the user selects one of the menu items by operating the remote keypad. Selection signals from the remote keypad identify a particular menu item. The controller responds to the selection signals by identifying the desired service associated with the input from the remote keypad. The controller operates the communications device to access the telephone line. Accessing the telephone line permits connection to an independent computer system providing the desired service. The controller prompts the independent computer system to provide the desired information or service. The controller displays the desired information or service on the television, and waits for additional input from the remote keypad. Use of a printer or a video recorder connected to the controller provides the user with an ability to produce a hard copy of the information displayed on the television.

Another aspect of the invention includes a pen-type pointing, drawing and writing device for creation of particular images on the television screen. A user controls a drawing cursor's position on the television display by moving the pointing device. After creating a desired image, the controller, responsive to selection signals from the remote keypad, prints images created with the pointing device, or captures the image and transmits it to an independent computer system. One embodiment of this drawing ability is a straightline sketching or CAD-type tool, similar to an Etch-A-Sketch ®. The independent computer system, depending upon particular menu options selected, directs the captured transmitted image to another user or to storage for later access. It is possible to capture television images transmitted from the television station and superimpose user-created graphics. One embodiment of this feature includes an ability to capture handwritten notes and forward them to another user in graphics form. Alternatively, screens from this electronic device, as well as information received from an accessed facility, in file form or in an on-line viewing format, can all be stored, printed, sent and videotaped.

Some pen-type pointing devices include a click button for indicating particular user actions when operated. One feature of an embodiment including this type of pointing device includes an ability to simulate keyboard input. The controller displays a keyboard image on the television. The user subsequently identifies each desired key by clicking within the keyboard image at positions corresponding to each desired key. Positioning the cursor and selecting particular key images permits simulation of typing. The controller is able to capture and transmit these typewritten-document images just as any other image. Many different types of pointing devices are available. It is believed that an IR responsive mouse-pen would be useful in many applications.

Still another aspect of the present invention includes an integral card reader (credit or debit card, for example) with the controller. This permits the user to conveniently purchase goods or services by use of the electronic device. The card reader permits a user to purchase products, pay-per-view programming, information services (videotext or audiotext). Further, the card reader permits screening access of the electronic device to restricted programming. In other words, to access particular features, a user must "swipe" a card through the card reader. The card may be a credit card to pay for the services or some other specially prepared and encoded card for controlling access. In addition to this screening mechanism, the electronic device may include personal identification number (PIN) password protection for access to selected services.

An additional aspect of a preferred embodiment in use of the electronic device to access audio information, such as voice mail or other audiotext facilities. A preferred embodiment provides for use of the electronic devices as a speaker phone. In the speaker phone embodiment, the electronic device includes a microphone and a displayed menu item, programmable and selectable by the remote keypad. Selection of the menu item results in the electronic device answering an incoming telephone call. Audio information is output over the television speaker. The electronic device can be used to record frequently used numbers (input from the remote keypad) and display them in a menu. Selection of a menu item initiates the desired call. Full conversation between the user and the called party is possible. In the case of audiotext for voicemail requiring DTMF signalling, the remote keypad may initiate these features.

The invention provides simple, efficient access to facilities (or limitation to particular facilities) without acquisition or configuration of computer components. Users select desired services from among several services displayed in menu by operation of a remote keypad. Autonomous self-configuration of the electronic device allows a system operator to enhance services or operation quickly and ensure that all users have their chosen services available to them. It is one embodiment to include predefined configuration for specialized implementations, such as private networks within a company or organization, that can be preconfigured with desired options. Optimally, a central computer can automatically configure all electronic devices (and related menus) connected on a private network. One example of the private network would be hotels offering room services and checkout through use of a properly configured electronic device. Other embodiments include access to facilities offering interactive television and other realtime online services.

Reference to the remaining portions of the specification and the drawings realize a further understanding of the nature and advantages of the invention.

DESCRIPTION OF THE PREFERRED EMBODIMENT

Figure 1:
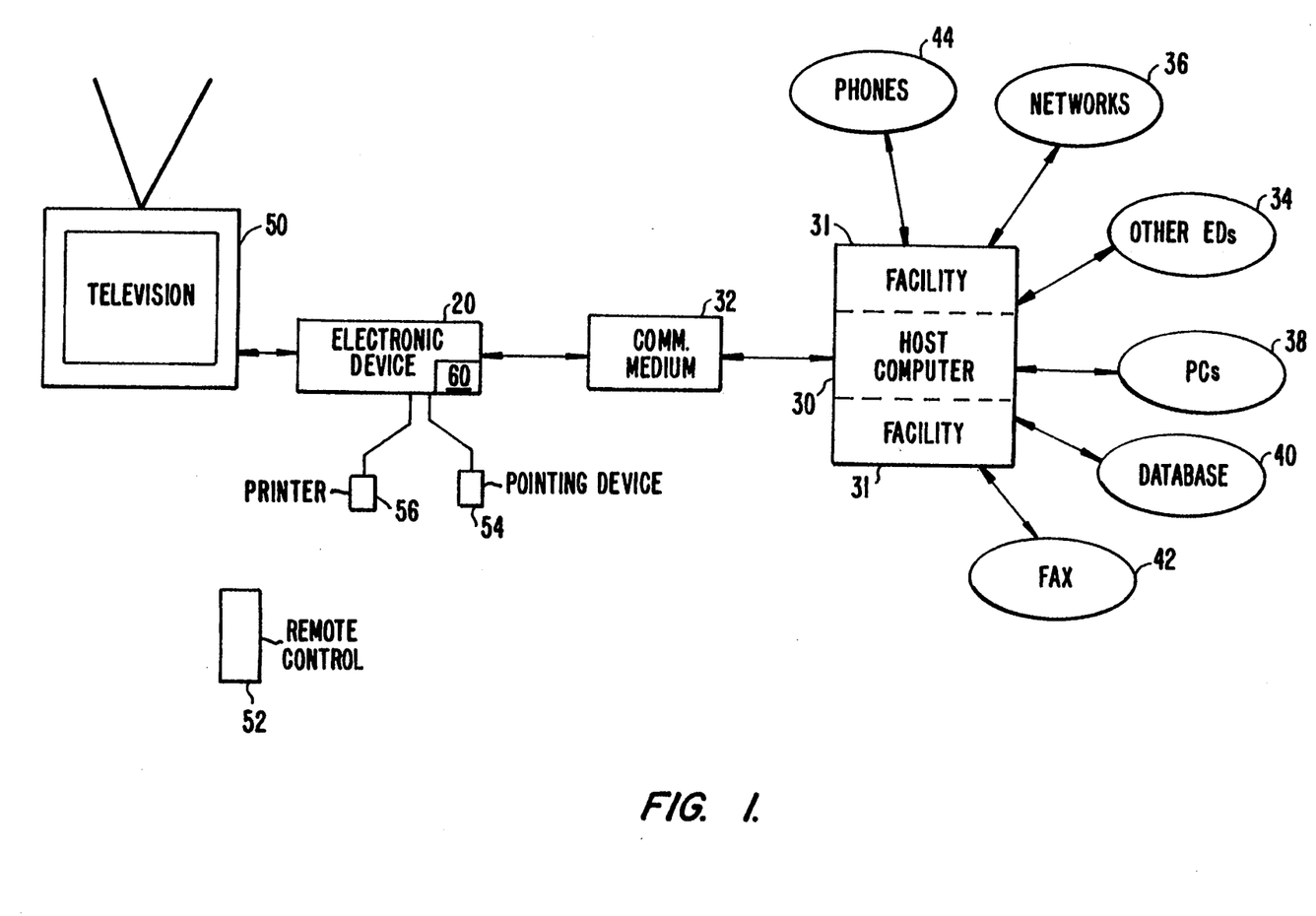
FIG. 1 is a block diagram of a videotext system 10 including an electronic device interface 20 having a preferred embodiment of the present invention.

FIG. 1 is a block diagram of a videotext system 10 including an electronic device interface 20 having a preferred embodiment of the present invention. The videotext system 10 includes an independent computer system (host computer) 30 providing one or more facilities a user desires to access. The host computer 30 connects to the electronic device 20 through a communications medium 32. Examples of the communications medium includes public-switched telephone networks, closed-circuit coaxial cables, and cellular telephone transmission networks. The host computer 30 provides access to many facilities 31, including other electronic devices (EDs) 34, networks 36, personal computers 38, databases 40 and facsimile or telex services 42, for example. Furthermore, for a speakerphone operation detailed further below, a facility may be a telephone 44. The host computer 30 includes a plurality of facilities 31 operable on the system itself. Additionally, facilities 31 on the host computer 30 provide access to remote facilities 31 such as other EDs 34.

The electronic device 20 interfaces these facilities for access and display on a conventional television 50. The user selects and controls access to the facilities displayed on or presented by (in the case of audio information) the television 50 by use of a remote keypad control 52. The remote keypad control 52 of the preferred embodiment is similar to conventional television remote controls for selection of channel and volume, for instance. The remote keypad control 52 provides menu selection signals to the electronic device 20 for selection of a particular facility of the host computer 30.

The electronic device 20 of the preferred embodiment includes a stylus-type or pen-type pointing and writing device 54 for creation of bitmap images on the television 50. The bitmap images include graphical and textual information drawn by the user. The user is able to direct the electronic device 20 to capture images from the television 50 screen. The images include any bitmap images created by the user. The electronic device 20 is able to transmit these captured images to the host computer 30 for storage or forwarding to any of the facilities the host computer 30 controls.

Additionally, the pointing device 54 is able to function as a text input device by interaction with an image of a conventional typewriter keyboard. Through display of the keyboard image on the television, and monitoring cursor positions associated with "clicks" of the pointing device 54, a user may "typewrite" information on the screen.

The electronic device 20 includes an interface for a printer 56. The electronic device 20 directs selected, captured images to the printer 56 for hard copy output. The printer 56 prints results of queries to the various selected facilities, the sketching or writing performed with the pointing device 54, or any other screen displayed.

Also shown in FIG. 1 is an integral card reader 60. This card reader 60 provides a ready and simple mechanism for each user to access premium facilities having a surcharge, or for purchase of items displayed by particular facilities, or even as an agent to arrange pay for view television programming.

Figure 2:
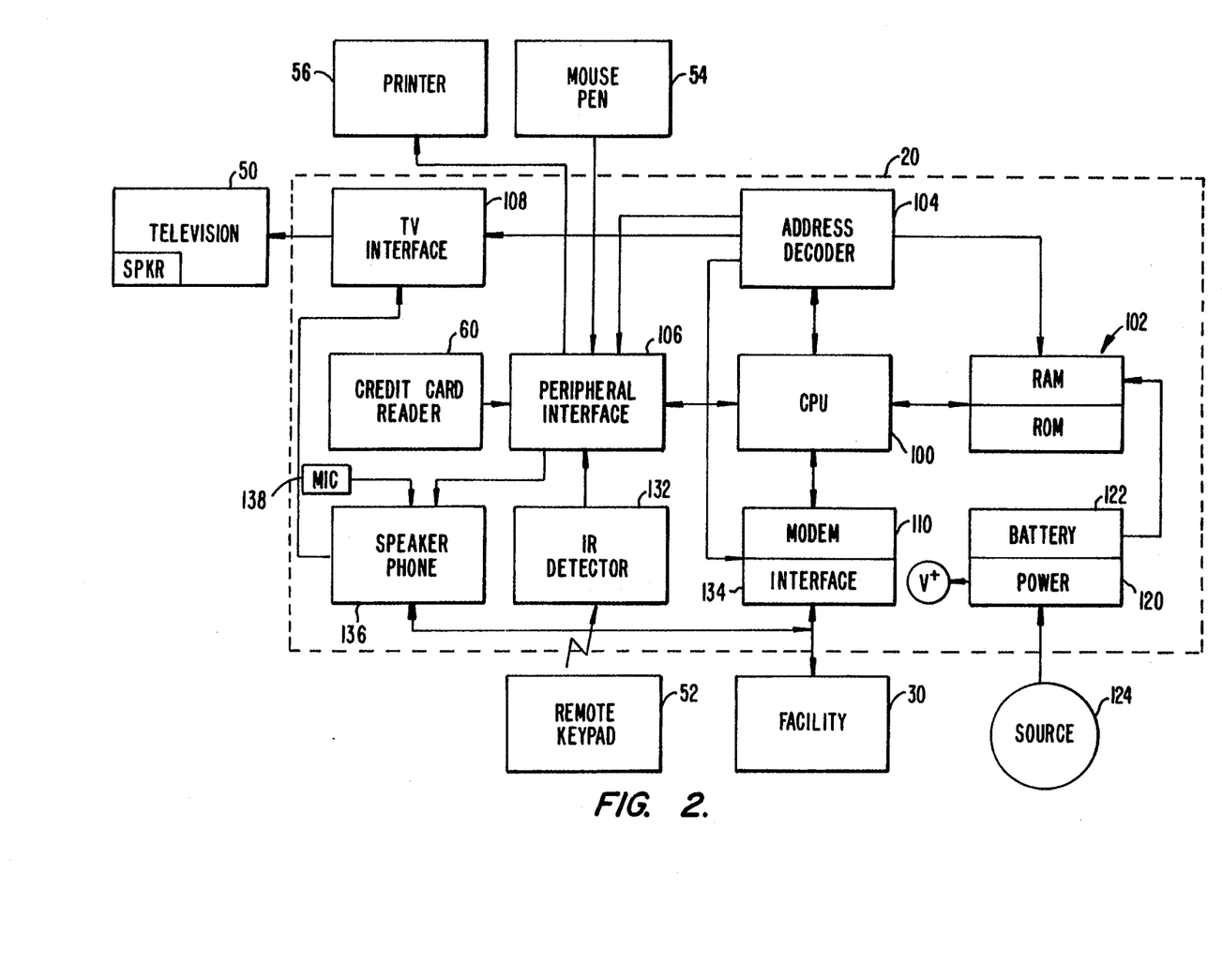
FIG. 2 is a block diagram of electronic device 20 according to a preferred embodiment.

FIG. 2 is a block diagram of the electronic device 20 according to a preferred embodiment. The electronic device 20 is a microcontroller-controlled appliance including a central-processing unit (CPU) 100 coupled to a memory 102, an address decoder 104, a peripheral interface 106, a television interface 108, for audio and video, as well as connection to a video recorder and a modulator/demodulator (modem) 110 by a data and address bus. The memory 102 includes both random read/write memory (RAM) and read-only memory. A power supply 120 generates power for the components of the electronic device 20 (V+), as well as to keep a battery-backup 122 charged. The battery-backup 122 provides power for the RAM when the power-supply 120 is not connected to a power source 124. Additionally, the preferred embodiment of the electronic device 20 includes the credit card reader 60 and an infrared detector 132, both coupled to the peripheral interface 106.

The CPU 100 controls operation of the electronic device 20 according to instructions stored in the ROM and the RAM of the memory 102. The ROM includes an initialization sequence which the CPU 100 executes upon every reset or power-up. The initialization sequence includes a set of commands causing the electronic device 20 connect to a particular facility 30 and self-configure itself in one preferred embodiment. The self-configuration includes receipt of particularized instructions for the particular electronic device 20, depending upon an identification code stored in the ROM. The CPU 100 stores these particularized instructions in the RAM.

The CPU 100 addresses the components of the electronic device 20 through the address decoder 104. The address decoder receives addresses from the CPU 100 and asserts a select signal to an identified component in response to a particular address. Components with an asserted select signal from the address decoder 104 interact with the CPU 100, either receiving instructions or providing data.

The peripheral interface 106 includes a parallel input/output port as well-known for interfacing to the printer 56, to the credit card reader 60, and to the IR detector 132. The peripheral interface 106 includes a serial interface for the pointing device 54. The parallel interface and the serial interface are separately selectable by the address decoder 104. Additionally, the peripheral interface 106 controls a speakerphone 136 circuit. The speakerphone 136, responsive to a hook control signal from the peripheral interface 106, couples an internal microphone 138.

The television interface 108 includes a video controller for text and graphics, connected to a video memory and a video modulator to produce television-compatible output. The television interface 108 connects to a conventional television for display of menus identifying the various facilities available to a user, and for displaying the information provided from a selected facility.

The modem 110, through an modem interface 134 particularized for the communications medium used by the electronic device 20, communicates with a selected facility 31. The modem 110 permits the electronic device 20 and the facility 31 to exchange information in a well-known fashion.

The card reader 60, a conventional device, reads magnetically encoded information on credit and debit cards. The card reader 60 provides output information to the CPU 100 through the parallel input/output function of the peripheral interface 106.

The IR detector 132 receives menu selection signals from the keypad remote control 52. The IR detector 132 provides the CPU 100, through the peripheral interface 106, with particular key information selected.

Figure 3:
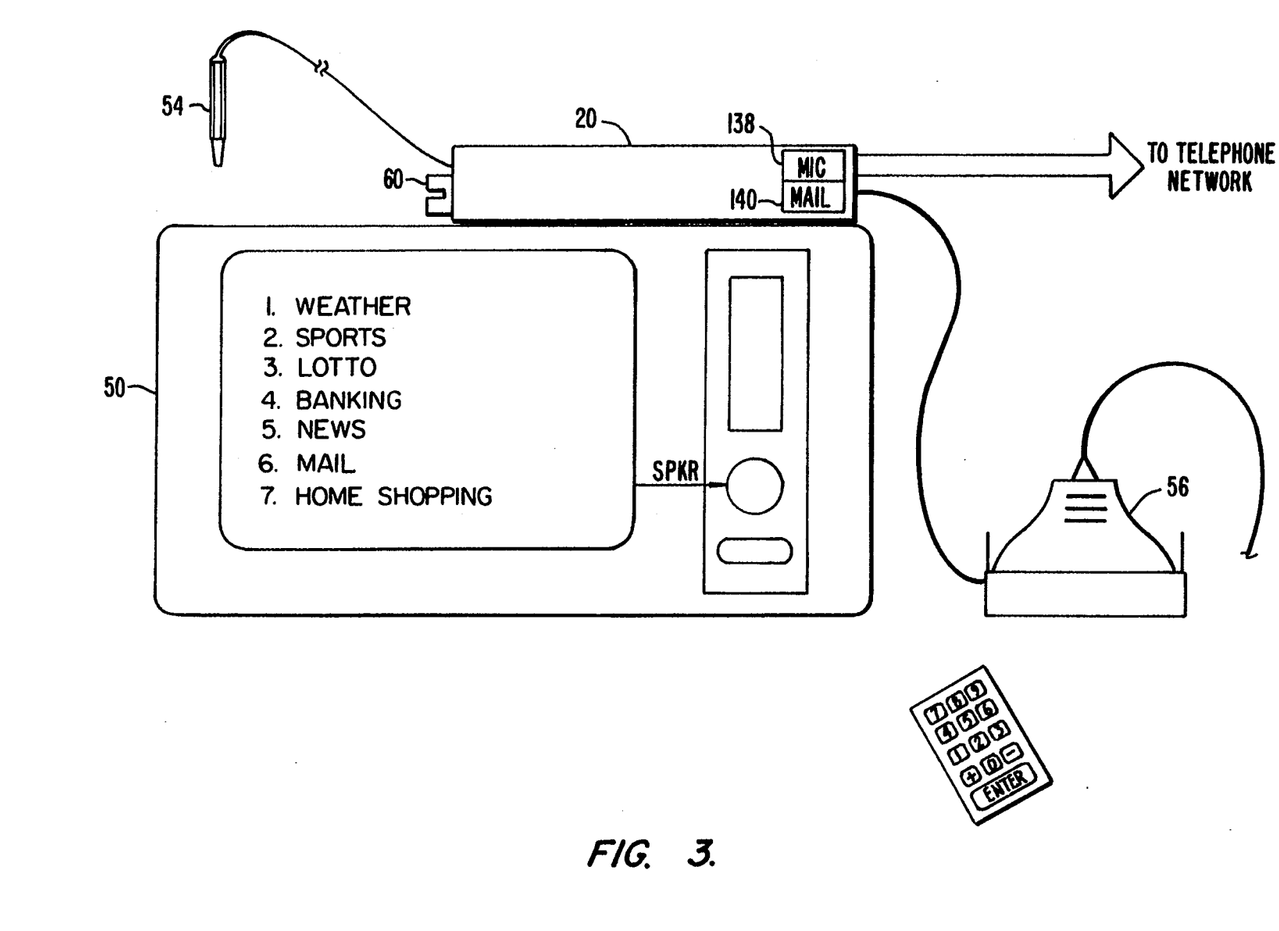
FIG. 3 is an illustration of one configuration of the electronic device 20 including menu items.

FIG. 3 is an illustration of one configuration of the electronic device 20 including display of selected menu items. The electronic device 20 provides the user with a menu of available services. The sample menu in FIG. 3 includes seven items which the user selects by use of the remote keypad control 52. The remote keypad control 52 does not employ a typewriter-type keyboard to implement the selected functions. By displaying a menu having numbered entries and selecting a corresponding number for a desired entry by use of the remote keypad control 52, the user accesses the desired facility. The electronic device 20 includes a microphone 138 for a speakerphone function and a mail indicator 140 which illuminates when new unread mail is available for the user.

The electronic device retrieves mail and other information in two manners. First, if an "auto-poll" function is not enabled (an option in one of the main menus), the user selects the electronic device mail option by use of the IR remote, prompting the electronic device to dial the database and retrieve any waiting mail or other information. The information is downloaded and the telephone connection terminated, or the user can view the information "on-line". Second, if the auto-poll feature is turned on by the user (or by the database remotely in configuring or reconfiguring the electronic device), the electronic device automatically dials the designated database at predetermined (either by the user or by the database in configuration) times, downloads "mail", terminates the telephone connection and turns on the mailwaiting light on the front of the electronic device. Through the use of the auto-poll function, the electronic device can be kept automatically updated with timely, fresh information from the services selected by the user or by the database. The mail message, can for example, indicate when a particular service has been activated and is available to the user, or confirm shipment of goods purchased through use of the electronic device.

Figure 4:
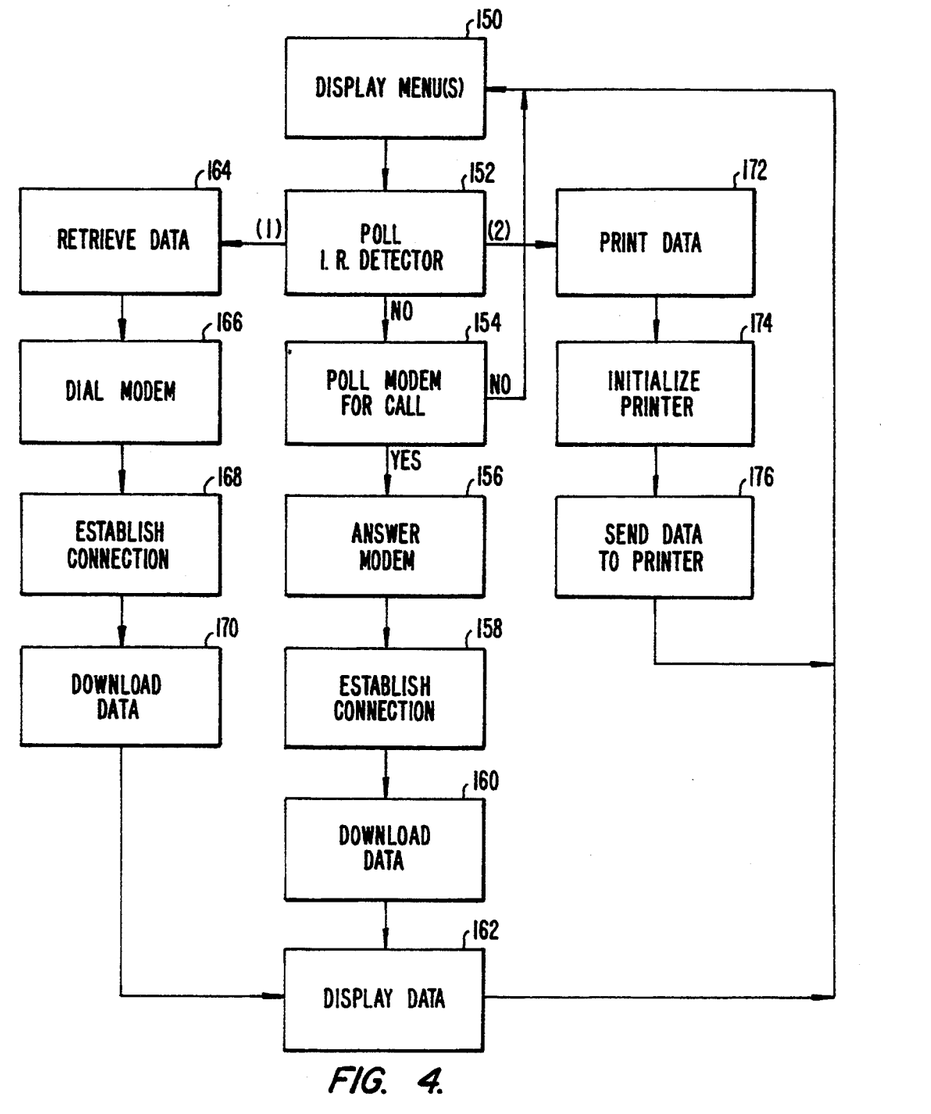
FIG. 4 is a flow chart illustrating general operation of electronic device 20.

FIG. 4 is a flow chart illustrating general operation of the electronic device 20 of FIG. 2. The electronic device 20 begins, after initialization, at step 150 and displays a menu of items available to the user.

When the electronic device is first turned on, it automatically calls its database host to receive operating instructions (such as which services to access and when). To view information screens on the electronic device, the user turns his television on, selects channel 3 or 4, and the electronic device main screens are displayed on the television screen.

The device, at step 152, next polls the IR detector 132 to determine if the user selected a displayed menu item by operating the remote keypad 52. Absent a selection from the remote keypad control 52, the program continues with steps 154 through 162, and returns to step 150. If the user selected a menu item corresponding to an available service of a remote facility, the program flow branches to steps 164 through 170. If the menu selection signals indicate the user desires a printout of the screen, the program flow branches to steps 172 through 176.

Steps 154 through 162 describe performance of the electronic device 20 for receiving and displaying inbound data calls. At step 154, the electronic device 20 checks the modem 110 for an incoming data call. If there is no incoming data call, the program returns to step 150 to display the user menu. If a call is present, the program executes steps 156 through 162. Step 156 answers the modem, step 158 establishes a connection with a remote facility calling the electronic device 20, step 160 downloads (receives) the data from the calling facility, and step 162 displays any information from the download. After displaying the information, the program returns to step 150. The incoming data may modify operation of the electronic device 20 by reconfiguring the system. The incoming data call may provide the user with an additional menu item if the facilities expand, or if the user requests additional options.

Steps 164 through 170 access and acquire desired information responsive to the selected menu item. The program retrieves stored information relating to accessing the desired facility from the memory 102. This information can include modem settings, node addresses, passwords, etc. Step 166 initiates and dials the modem 110, and step 168 establishes a connection with the host computer 30 providing the desired service. After connection, the electronic device 20 initiates a download of the desired information at step 170. After downloading the information, the electronic device branches to step 162 to display the information for the selected service. After displaying necessary information desired by the selected service, the program returns to step 150.

Steps 172 through 176 produce a printout of the current television image. Step 172 captures data for printing, either in text or graphics form. Step 174 initializes the printer 56 and step 176 sends the captured print data to the printer 56 for printing. The program returns to step 150 after step 176.

Figure 5:
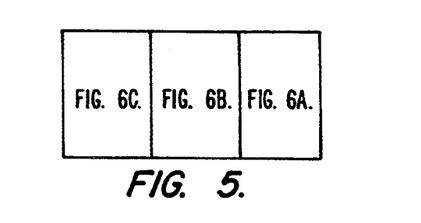
FIG. 5 is a top level software flow diagram illustrating a typical operation for a preferred embodiment.

FIG. 5 is a top level software flow diagram illustrating a typical operation for a preferred embodiment of the present invention as implemented in the source code included in the appendix. The source code appendix includes five software modules to implement the functions of the electronic device 20. These modules include ED.C, EDDATA.C, ED.H, ED.ASM, and DRAWSUBS.C.

The ED.C module is the main program which calls the necessary subroutines and functions to implement a particular combination of services for a user of the electronic device 20. The configuration program may be self-contained within the electronic device 20, or loaded remotely from a configuration facility, for example. The ED.C includes the C-code main definition. ED.C includes some functions not found in the other modules that are specific to text manipulation, such as for example, scrolling.

ED.H is a C-program header file which includes the global definitions, tables and equates used in other modules.

EDDATA.C are strictly menu data in ASCII format. Each menu screen includes a name, such as "MAIN MENU" for example. The ED.C program retrieves particular screens by reference to the appropriate name.

ED.ASM includes primitives for low-level operation of particular features or common tasks. For example, these primitives decode one key press from the IR receiver, send one byte to the modem, receive one byte from the modem, control the mail status light toggling, write one pixel on a screen, etc. Other features control graphics screens, the pointing device, card reader, and speakerphone for example. These may be described as generic, universal routines to perform the selected functions.

DRAWSUBS.C are higher level primitives, written in a C-language, for performing a next higher level of functional control. For example, the primitives in DRAWSUBS.C include code to use the primitives of the ED.ASM module to draw boxes or lines, or to set a mode between graphics and text, for example.

Figure 6A:
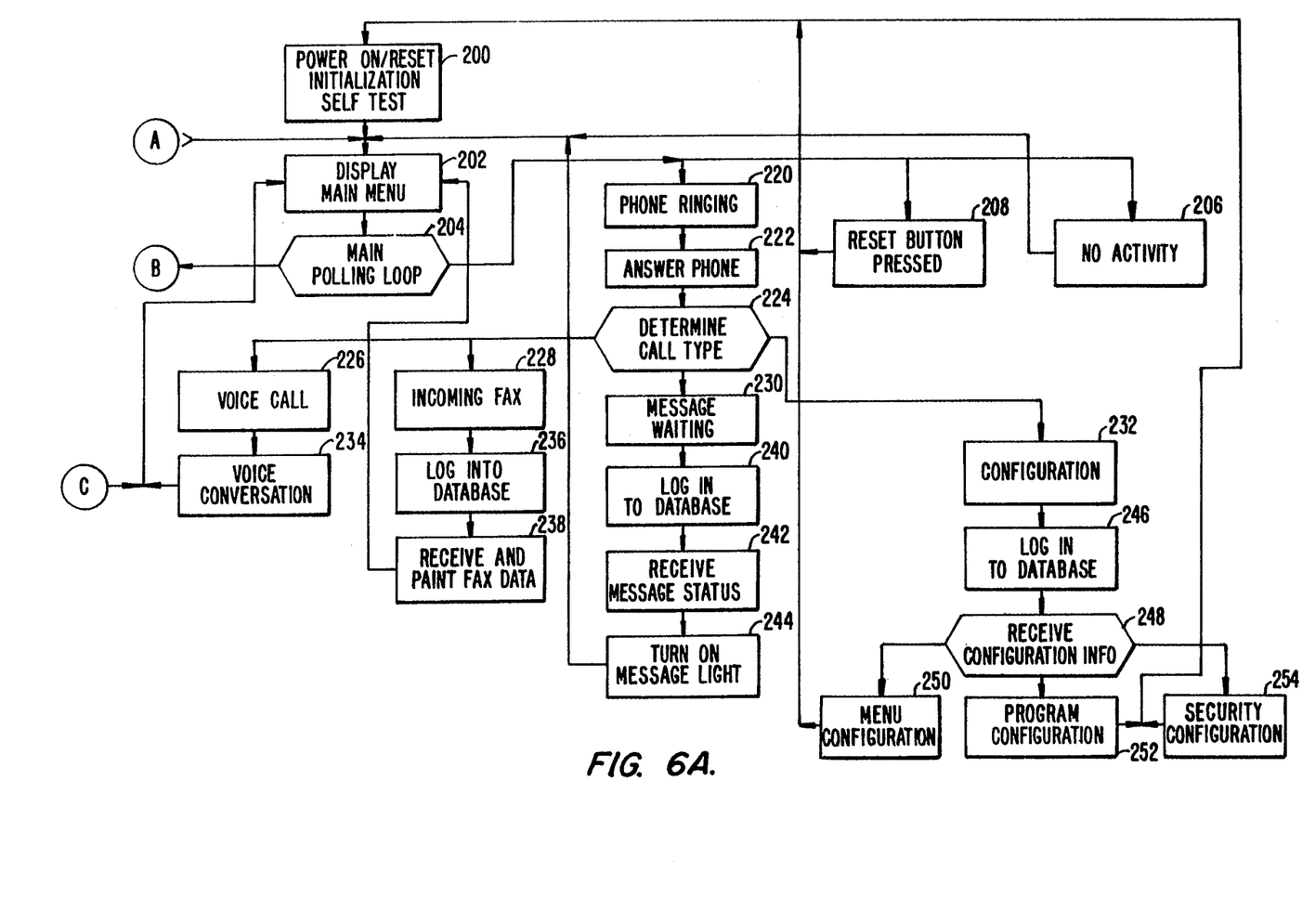
FIGS. 6A through 6C are detailed sections of identified portions of the software flow diagram of FIG. 5.
Figure 6B:
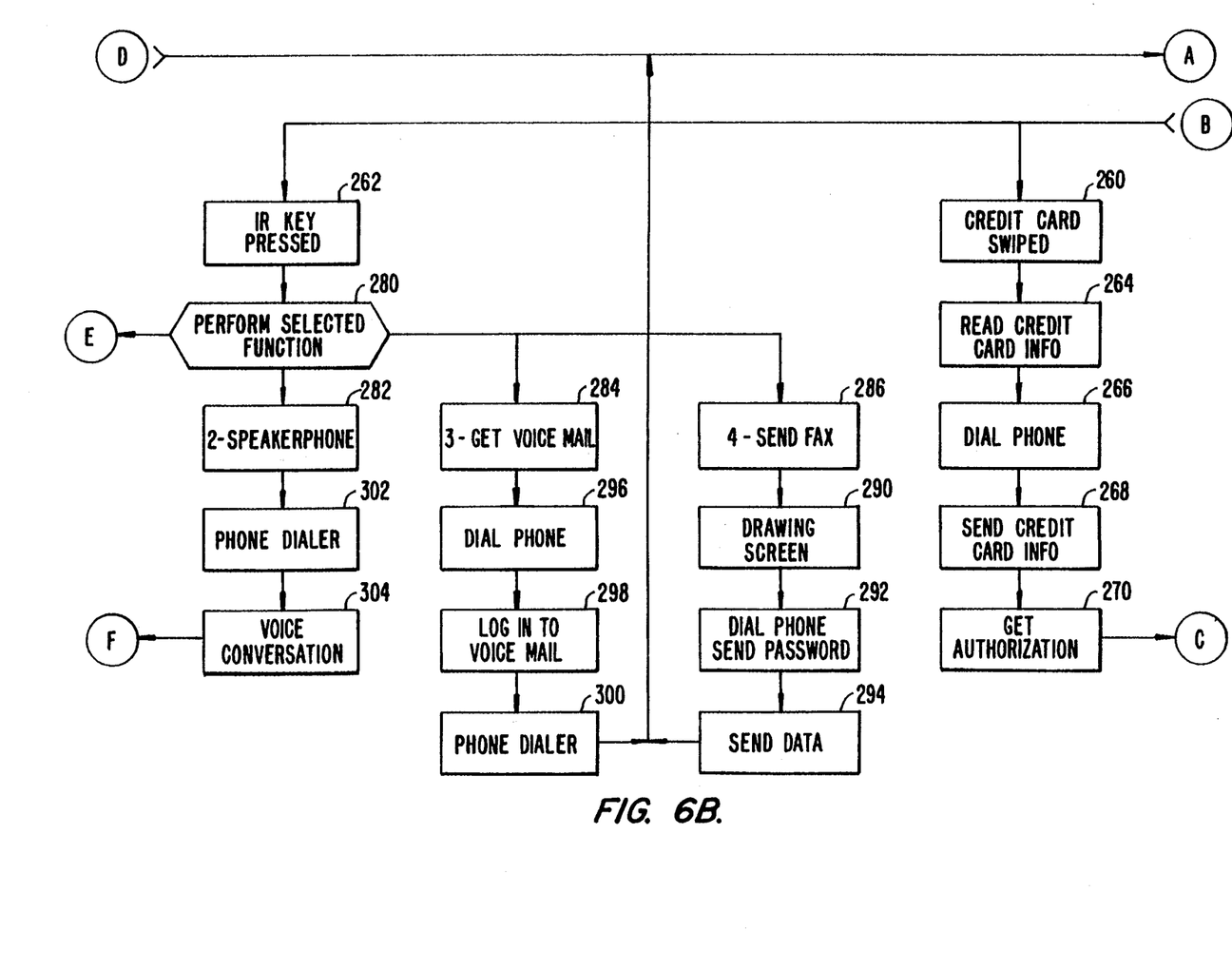
Figure 6C:
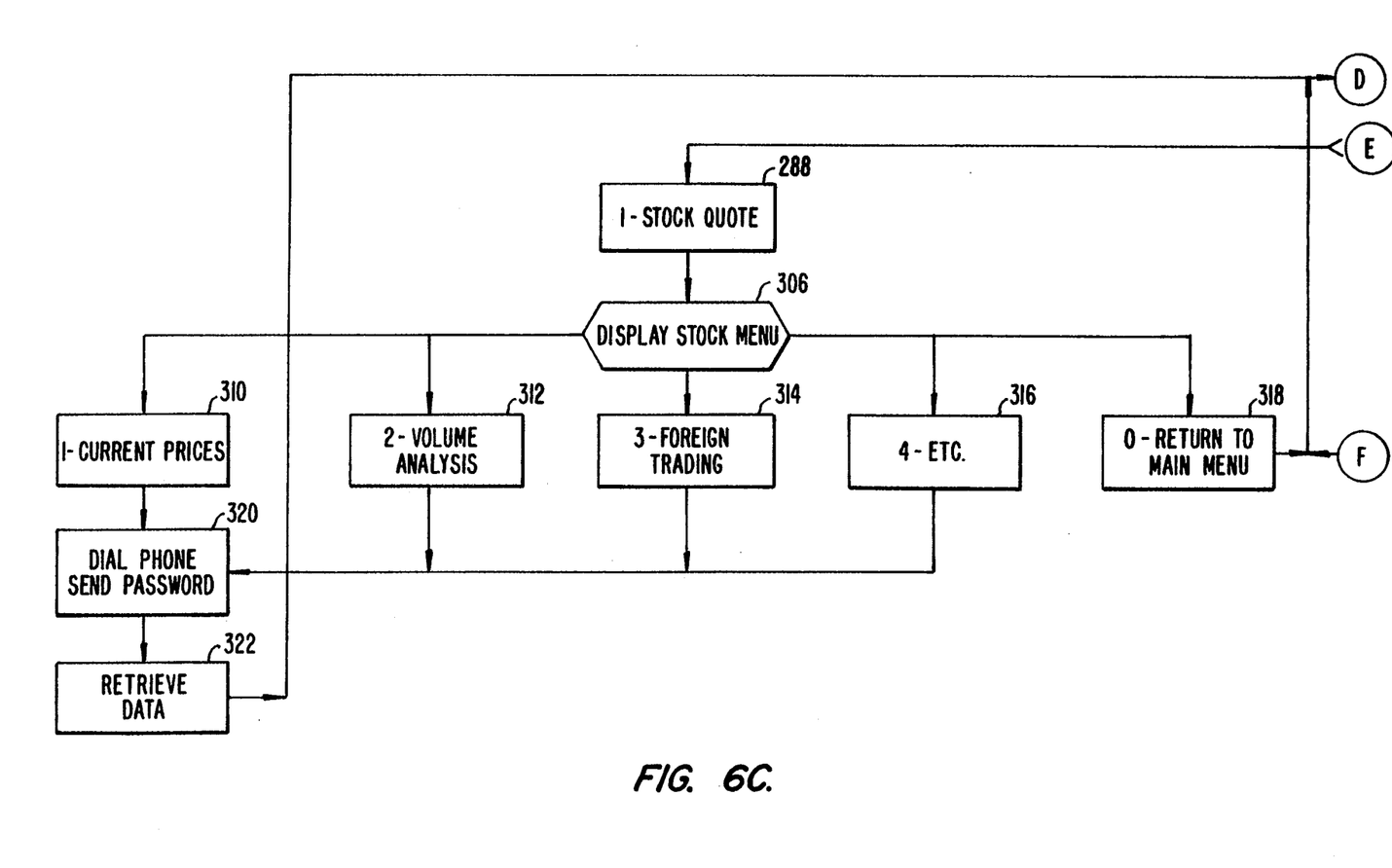

Details of FIG. 5 are found in the appropriate one of FIGS. 6A through 6C. FIG. 6A includes a set of steps for initialization and active monitoring for input from a user. Step 200 includes a power on/reset initialization and self-test functions. After step 200, the device displays its main menu at step 202. Step 204 is a main polling loop, waiting for different activities. These activities include detecting no activity (step 206), a manual reset (208), a ringing phone (step 220), a credit card swipe (step 260 in FIG. 6B) or an IR key activation (step 262 in FIG. 6B).

Detection of no activity at step 206 branches the program back to step 202. A manual reset at step 208 returns the program to step 200 for reset initialization and self-test.

A ringing phone at step 220 results in the electronic device answering the phone (step 222) and a subsequent determination of a call type at step 224. The call may be either a voice call (step 226), an incoming fax (step 228), a mail message waiting call (step 230), or a configuration call (step 232).

The voice call type results in allowing the user to normally use the telephone to conduct a voice conversation (step 234) and return to display the main menu (step 202). An incoming fax results in the electronic device logging into an appropriate facility (step 236) and receiving printing the fax document (step 238) from the facility. Subsequently, the program flow returns to display of the main menu step 202.

A message waiting causes the electronic device to log into a mail facility (step 240), receive the message (step 242), and turn on the message light (step 244). Thereafter, the system returns to step 202 to display the main menu.

The call type may be a configuration call, which causes the device to log into a configuration facility (step 246), and receive configuration information at step 248. The configuration information may be menu configuration (step 250), program configuration (252) or security configuration (step 254). After receiving the configuration information, the program returns to reset, step 200.

FIG. 6A connects to FIG. 6B at the indicated markings of A, B and C. FIG. 6B illustrates two other activities, credit card swiping in the card reader (step 260) and IR key activation (step 262). Credit card swiping results in the device reading the card information (step 264), dialing the phone (step 266), sending the card information (step 268) and obtaining any necessary authorization (step 270). The system returns to step 202, FIG. 6A, thereafter.

Activation of an IR key performs a selected function, correlated to a function presently displayed on the television, in a menu format (step 280). Representative functions, for purposes of explanation only, include speakerphone operation (step 282), get voicemail (step 284), send a fax (step 286) or do stock quotes (step 288). Other functions, including those previously described, may be implemented in similar fashion.

Step 282 is followed by dialing the phone (302) and conducting a voice conversation (step 304) by using the microphone of the device and the television speaker. The program flow returns to step 202.

After step 282, the device dials the phone (step 296), logs into a voicemail facility (298) and activates DTMF signalling to retrieve voicemail (step 300), if necessary. The program returns to step 202 after obtaining voice messages, which may be presented on the television speaker.

To send a fax, after step 286, the devices presents a drawing screen, recording cursor movements recorded through use of the pointing device (step 290), dials the phone and sends a password (step 292), and sends the image data to a fax facility (step 294). The image is typically transmitted in PCX format.

FIG. 6C connects to FIG. 6B at points D, E, and F. If a decoded IR key activation routes the program to step 288, the device displays a sub-menu of stock quote options at step 306). These options include current prices (step 310), volume analysis (step 312), foreign trading (step 314) or other service (step 316) or an option to return to a previous menu (step 318), which in this case is step 202 displaying the main menu.

Steps 310, 312, 314 and 316 advance to step 320 which dials the phone and sends the password to the appropriate stock facility. Step 322 retrieves the appropriate data, depending upon the particular desired option, and returns to step 202 for display of the main menu.

The configuration of the preferred embodiment of the present invention does not limit itself solely to accessing and receiving requested information. The present invention is able to access remote facilities and initiate desired activities on behalf of the user using the electronic device. The present invention includes an ability to store profile information relating to the user, such as cable service provider, etc. and initiate calls, at the users behalf, to authorize the cable service provider to provide "pay-per-view" service or interactive television, for example. By using the credit card reader, or credit card information stored in the memory 102, the electronic device may quickly provide access and authorization for particular events the user desires. In this fashion, the electronic device 20 provides a simple interface to the electronic networks available to conventional computer users, without the expense and complexity of learning to operate a personal computer and associated hardware and software. The electronic device has the ability to capture displayed television images and convert them to PCX format, a widely used graphic standard. The PCX format is useful in many forms, including facsimile transmission.

In conclusion, the present invention provides a simple, efficient solution to a problem of accessing, using and paying for the many electronic facilities presently available. Complex and time-consuming acquisition and configuration, as well as training in use of the computer components becomes unnecessary with the present device. While the above is a complete description of the preferred embodiments of the invention, various alternatives, modifications, and equivalents may be used. Therefore, the above description should not be taken as limiting the scope of the invention which is defined by the appended claims.

What is claimed is:

1. In a data communication system having a host computer coupled to a telephone network and an electronic device coupled to said telephone network, a method for providing access at said electronic device to a plurality of facilities coupled to said host computer, said method comprising the steps of:

calling upon application of power to said electronic device said host computer from said electronic device through a modem coupled to said telephone network and to said electronic device, to establish a first data communication link between said electronic device and said host computer via said telephone network and said modem;

transferring configuration data from said host computer to said electronic device via said first data communication link; thereafter breaking said first data communication link;

assembling from said configuration data a menu listing a plurality of titles identifying said plurality of facilities; thereafter displaying said menu on a television coupled to said electronic device; thereafter accepting, at a remote keypad, an operator input specifying a selected one of said plurality of facilities;

transmitting, from said remote keypad to an IR detector coupled to said electronic device, an infrared signal responsive to said operator input;

detecting said infrared signal at said IR detector; thereafter calling said host computer from said electronic device via said modem and said telephone network, thereby establishing a second data communication link between said host computer and said electronic device via said modem and said telephone network; and thereafter connecting said electronic device to said selected facility via said second data communication link and said host computer.

2. The method of claim 1 further comprising the step of transferring configuration data particularized to said selected facility from said host computer to said electronic device via said second data communication link.

3. The method of claim 1 wherein said selected facility is an online computer service.

4. The method of claim 1 wherein said selected facility is a facsimile service.

5. The method of claim 1 wherein said selected facility is a voicemail service.

6. The method of claim 1 wherein said selected facility is an electronic mail service.

7. The method of claim 1 wherein said selected facility is a stock quote service.

8. The method of claim 1 wherein said selected facility is a pay-per-view service.

9. In a data communication system having a host computer and an electronic device wherein said host computer and said electronic device are coupled to a telephone network, a method for providing interactive access at said electronic device to data stored at a plurality of facilities coupled to said host computer, said method comprising the steps of:

calling, upon application of power to said electronic device, said host computer from said electronic device through a modem coupled to said telephone network and to said electronic device, to establish a first data communication link between said electronic device and said host computer via said telephone network and said modem;

transferring configuration data from said host computer to said electronic device via said first data communication link;

breaking said first data communication link;

assembling from said configuration data a menu listing a plurality of titles identifying said plurality of facilities; thereafter displaying said menu on a television coupled to said electronic device; thereafter accepting, at a remote keypad, a first operator input specifying a first selected one of said plurality of facilities;

transmitting, from said remote keypad to an IR detector coupled to said electronic device, a first infrared signal responsive to said first operator input;

detecting said first infrared signal at said IR detector; thereafter calling said host computer from said electronic device via said modem and said telephone network to establish a second data communication link between said host computer and said electronic device via said modem and said telephone network; thereafter accessing said first selected facility from said electronic device via said second data communication link; and thereafter transferring data associated with said first selected facility from said host computer to said electronic device via said second data communication link.

10. The method of claim 9 further comprising the steps of:

generating an image from said data associated with said first selected facility; and thereafter displaying said image on said television.

11. The method of claim 10 further comprising the step of storing said image on a video recorder coupled to said electronic device.

12. The method of claim 9 further comprising the step of storing said data associated with said first selected facility on a video recorder coupled to said electronic device.

13. The method of claim 9 further comprising the steps of:

breaking said second data communication link; thereafter accepting, at a remote keypad, a second operator input specifying a second selected one of said plurality of facilities;

transmitting, from said remote keypad to an IR detector coupled to said electronic device, a second infrared signal responsive to said second operator input;

detecting said second infrared signal at said IR detector; thereafter calling said host computer from said electronic device via said modem and said telephone network to establish a third data communication link between said host computer and said electronic device via said modem and said telephone network; thereafter accessing said second selected facility from said electronic device via said third data communication link; and thereafter transferring data associated with said second selected facility from said host computer to said electronic device via said third data communication link.

14. The method of claim 13 wherein said data transferred via said third data communication link includes configuration data associated with said second selected facility.

15. In a data communication system having a host computer and an electronic device wherein said host computer and said electronic device are coupled to a telephone network, a method for transferring textual data from the electronic device to the host computer, said method comprising the steps of:

calling said host computer from said electronic device through a modem coupled to said telephone network and to said electronic device, to establish a first data communication link between said electronic device and said host computer via said telephone network and said modem;

transferring configuration data from said host computer to said electronic device via said first data communication link; thereafter assembling a menu from said configuration data, said menu including a plurality of titles identifying a plurality of available terminal functions wherein transmission of textual data is one of said plurality of available terminal functions; thereafter breaking said first data communication link;

displaying said menu on a television coupled to said electronic device;

accepting at a remote keypad an operator input specifying transmission of textual data as a selected one of said plurality of available terminal functions;

transmitting, from said remote keypad to an IR detector coupled to said electronic device, an infrared signal responsive to said operator input; thereafter displaying a keyboard image on a television coupled to said electronic device, wherein a plurality of discrete regions of said keyboard image are labeled with distinct characters;

displaying a cursor image within said keyboard image on said television, said cursor image positioned within one of said discrete regions selected by user adjustment of a pointing device;

recording a sequence of said distinct characters labelling said discrete regions within which said cursor image is positioned during successive user depressions of a key coupled to said pointing device, thereby generating said textual data; thereafter calling said host computer from said electronic device via said modem and said telephone network, to establish a second data communication link between said host computer and said electronic device via said modem and said telephone network; and thereafter transferring said textual data from said electronic device to said host computer via said second data communication link.

16. In a data communication system having a host computer and an electronic device wherein said host computer and said electronic device are coupled to a telephone network, a method for transferring graphical data from the electronic device to the host computer, said method comprising the steps of:

calling said host computer from said electronic device through a modem coupled to said telephone network and to said electronic device, to establish a first data communication link between said electronic device and said host computer via said telephone network and said modem;

transferring configuration data from said host computer to said electronic device via said first data communication link; thereafter assembling a menu from said configuration data, said menu including a plurality of titles identifying a plurality of available terminal functions wherein transmission of textual data is one of said plurality of available terminal functions; thereafter displaying a menu on a television connected to said electronic device;

accepting at a remote keypad an operator input specifying transmission of graphical data as a selected one of said plurality of available terminal functions;

transmitting, from said remote keypad to an IR detector coupled to said electronic device, an infrared signal responsive to said operator input; thereafter recording, at said electronic device, movements of a pointing device, thereby generating said graphical data;

displaying said graphical data on said television;

calling said host computer from said electronic device via said modem and said telephone network, to establish a second data communication link between said host computer and said electronic device via said modem and said telephone network; and thereafter transferring said graphical data from said electronic device to said host computer via said second data communication link.

17. An electronic device for providing access to a plurality of facilities coupled to a host computer, said electronic device comprising:

means for interfacing to a television;

a remote keypad for transmitting menu selection signals;

a modem coupled to a telephone network to which said host computer is coupled; and a controller coupled to said television interfacing means and said modem and in wireless communication with said remote keypad, for:

initiating, upon application of power to said electronic device, a first data call to said host computer through said modem and said telephone network to obtain configuration data from said host computer;

assembling a menu listing a plurality of titles of said plurality of facilities from said configuration data;

displaying said menu on said television;

accepting, via said remote keypad, a user selection of a selected one of said plurality of facilities; and initiating a second data call to said host computer through said modem and said telephone network to establish a connection between said electronic device and said selected facility.

18. The electronic device of claim 17 further comprising an access limiting device coupled to said controller.

19. The electronic device of claim 18 wherein said access limiting device controls access to restricted programming.

20. The electronic device of claim 18 wherein said access limiting device verifies user purchases.

21. The electronic device of claim 18 wherein said access limiting device is a credit card reader.

22. The electronic device of claim 17 further comprising a pointing device coupled to said controller for generating cursor movements on said television, wherein said cursor movements are recorded at said controller, thereby generating image data.

* * * * *

UNITED STATES PATENT AND TRADEMARK OFFICE
CERTIFICATE OF CORRECTION

PATENT NO. : 5,396,546

DATED : Mar. 7, 1995

INVENTOR(S) : Roger Remillard

It is certified that error appears in the above-indentified patent and that said Letters Patent is hereby corrected as shown below:

On the title page, item [45], should read:
Date of Patent: Mar. 7, 1995

The following should be deleted from the title page, column 1, of the patent:

[*] Notice: The portion of the term of this patent subsequent to Jan. 11, 2011 has been disclaimed.

Signed and Sealed this

Fourteenth Day of May, 1996

Attest:

BRUCE LEHMAN

*Attesting Officer*      *Commissioner of Patents and Trademarks*